Feb. 2, 1960  J. A. McINERNEY  2,923,317
SWING CHECK VALVE
Filed Nov. 17, 1955  3 Sheets-Sheet 1
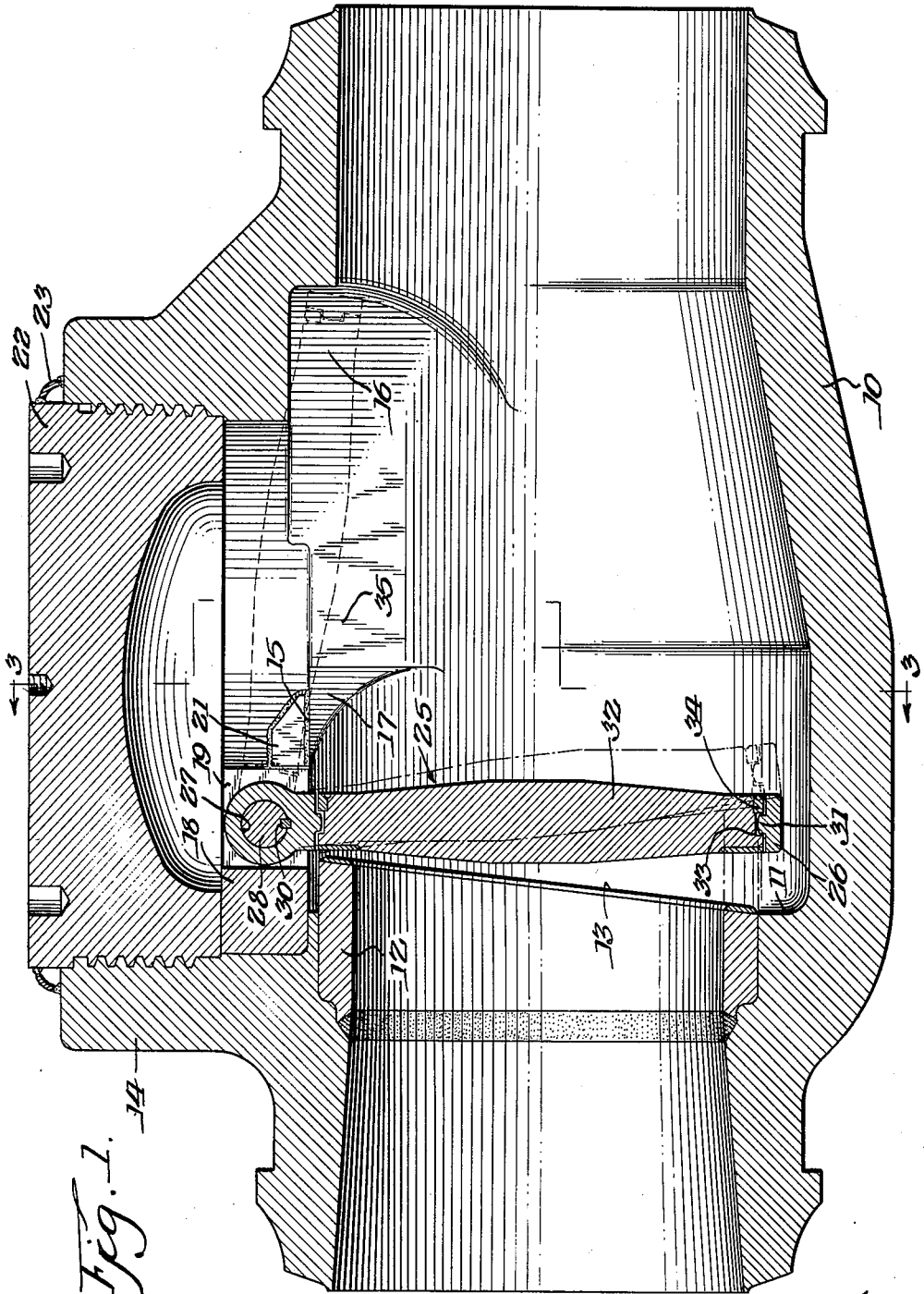
Inventor.
John A. McInerney,
By Joseph C. Lange Atty.

Feb. 2, 1960  J. A. McINERNEY  2,923,317
SWING CHECK VALVE
Filed Nov. 17, 1955  3 Sheets-Sheet 2
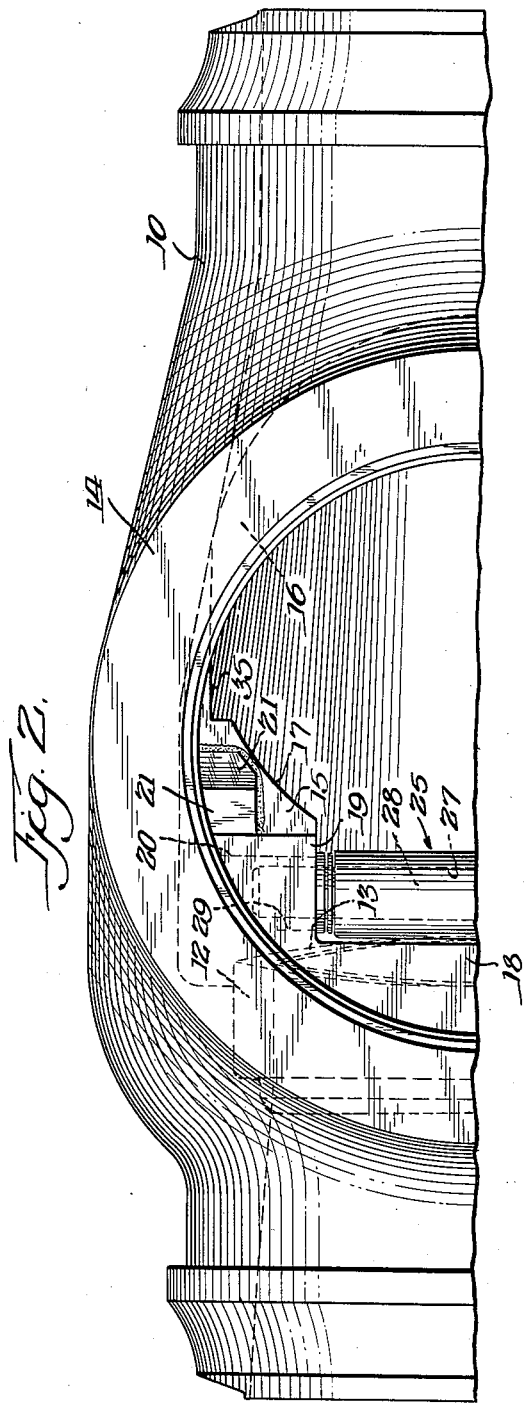
Inventor.
John A. McInerney
By Joseph O. Lange
Atty.

Feb. 2, 1960 J. A. McINERNEY 2,923,317
SWING CHECK VALVE
Filed Nov. 17, 1955 3 Sheets-Sheet 3
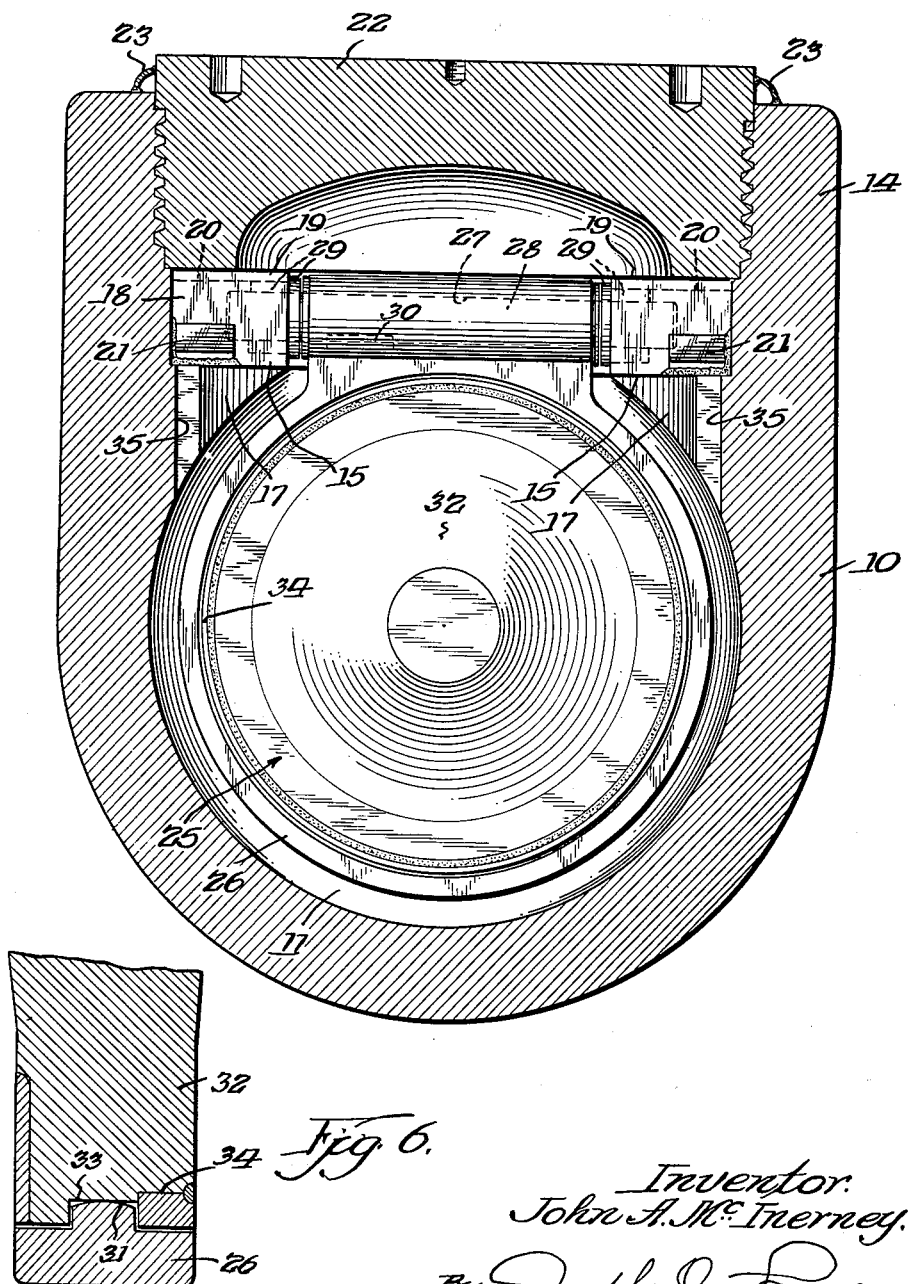
Inventor:
John A. McInerney,
By Joseph O. Lange
Atty.

United States Patent Office 2,923,317
Patented Feb. 2, 1960

2,923,317

SWING CHECK VALVE

John A. McInerney, Evergreen Park, Ill., assignor to Crane Co., Chicago, Ill., a corporation of Illinois Application November 17, 1955, Serial No. 547,359

5 Claims. (Cl. 137—527.2)

The present invention relates to a swing check valve, and more particularly to a swing check valve having a novel valve closure and mounting therefor.

In some fluid systems employing swing check valves, it is necessary that flow at low velocity be permitted without resistance by the valve disks, and at the same time that reverse flow even at low velocity be prevented. It is also desirable that minimum pressure drop occur at each valve. Swing check valves commonly provided open only upon flow at considerable velocity due to weight or pressure of the disk on the seat, and in many cases do not reliably prevent reverse flow below a minimum velocity because appreciable back pressure is required to seat the disk tightly. Such valves, furthermore, by reason of relatively large body portions and contours creating turbulence, cause a pressure drop of considerable magnitude and thereby increase pump capacity requirements. The valve of the present invention provides for inlet flow at the lowest of velocities without interference or resistance by the disk, and yet prevents reverse flow even at very low velocity. The valve also minimizes pressure drop, achieving a further advantage over conventional valves of this type. The valve construction according to the invention accomplishing the many advantages comprises a valve member which normally depends vertically below a hinge axis to swing toward and from a valve seat which extends at an angle so that the seating face is directed downwardly. The center of gravity of the valve member is in the vertical plane of the hinge axis, so that the valve is normally partly open, and the hinge axis is provided by a bracket member which may be rotated on a supporting ledge or shoulder about a vertical axis to bring the hinge axis parallel to the plane of the valve seat and then permanently secured against further rotation, so that the valve member swings squarely onto the seat. The valve member is formed with a hinge part or holder in which the valve disc is carried somewhat loosely so that it may rock slightly in finding precise engagement on the seat. By reason of the balanced valve member and the relatively short moment arm possible with this construction, not only is the valve kept open for forward or inlet flow through the valve at low velocities without any resistance by the valve member which otherwise would require appreciably higher velocities for opening, but the valve member is easily swung to closed position by reverse flow at low velocity. Similarly, minimum impedance to flow by the weight of the valve member and turbulence due to the form of the body results in low pressure drop through the valve. The hinge bracket is removably mounted on its support so that the bracket and valve member may readily be removed and the valve member reversed and reinserted to present the opposite face to the seat so as to double the life of the disk. The assembly of the valve member is fast and simple, and a shock-resistant construction is provided by the mounting of the disk in the holder. The construction and its advantages are described more fully hereinafter.

It is an important object of the invention to provide a swing check valve which permits forward or inlet flow at very low velocity.

Another object is the provision of a swing check valve which closes tightly upon reverse flow even at low velocity.

Another object is the provision of such a valve in which pressure drop is greatly minimized.

A further object is the provision of a swing check valve in which the hinge axis of the swinging valve disk may be adjusted to parallelism with the plane of the valve seat and maintained in such adjusted relation to assure square seating.

Another object is the provision of a swing check valve with an angled valve seat facing downwardly relative to the valve disk hinge axis.

It is also an object of the invention to provide a check valve having a swing valve disk nicely balanced for easy opening and closing at low velocities.

Another object is the provision of a check valve with a swing valve disk normally partly open to allow inlet flow at low velocity with resistance by the disk.

A further object is the provision of a swing check valve in which the valve disk is mounted in a swinging holder for limited rocking movement in finding exact seating when closed.

Another object is the provision of a swing check valve allowing use of a reversible valve disk and providing for easy reversal of the disk.

Still another object is the provision of a swing check valve providing for quick and simple assembly and mounting of a hinged valve disk.

Another object is the provision of a swing check valve having a shock-resistant valve member construction.

Other and further objects, advantages, and features of the invention will be apparent from the following description read in the light of the accompanying drawings, in which:

Fig. 1 is a vertical longitudinal sectional assembly view through a valve embodying the invention;

Fig. 2 is a plan view of substantially one longitudinal half of the valve shown in Fig. 1, the other half being substantially identical;

Fig. 3 is a cross-sectional view taken approximately as indicated by the line 3—3 of Fig. 1;

Fig. 4 is a perspective view of the valve disk hinge bracket;

Fig. 5 is a perspective view of the valve disk holder; and

Fig. 6 is an enlarged detail view of a portion of the valve closure member as shown in Fig. 1.

Referring to the drawings, there is shown a swing check valve construction having a valve body 10 which is generally cylindrical in form, although as shown, certain portions may be conical. An enlarged cylindrical portion is provided in the body to define a circumferential shoulder 11 therein, within which is secured a valve seat ring 12. One end of the ring projects into this enlarged portion and extends in an angular plane downwardly from the upper portion of the valve body, so that the upper portion of the ring projects from the shoulder 11 forwardly of the lower ring portion, as clearly shown in Fig. 1. This downwardly facing angular end of the ring provides a valve seat 13, which may be provided with a facing resistant to wear or chemical attack. The body 10 has a cylindrical portion 14 extending radially therefrom, the axis of which is spaced forwardly from the valve seat 13. The cylindrical portion is hollow, its upper end defining an access aperture. The bore of this hollow portion extends through the upper portion of the circular wall of the body to open thereinto. A ledge or shoulder 15 is defined at the juncture of the hollow portion 14 and the body, as will be evident from the drawings, by material of the body wall adjacent the lower end of the bore. In this case, the shoulder is shown as extending substantially in three portions, a central one overlying the upper portion of the seat ring 12 extending transversely relative to the body, and the other two extending longitudinally of the body at each side of the central portion. The particular shape of the shoulder is not of primary importance, however, and it might be of other form than that shown. The body is also formed with a recess 16 which is offset from the bore of the hollow portion and in effect includes an arcuate edge portion 17 of each side portion of the shoulder 15, so that a circular valve closure member may be received therein in its fully open position indicated in dotted lines in Fig. 1. On the shoulder 15 is loosely disposed a hinge bracket 18 which, as best shown in Fig. 4, is segmental in shape, having an arcuate surface which engages the inner face of the hollow portion 14 so that it may be rotated therein. The bracket also has a pair of spaced arms 19 partially defined by the arcuate surface through which extend aligned pin-receiving bores 20. The bracket may be shifted on the shoulder to bring the axis of the bores 20 parallel to the plane of the valve seat 13, after which lugs 21 may be welded or otherwise secured to the shoulder 15 or the cylindrical portion 14, or both, in engagement with the ends of the arms 19 to hold the bracket against rotation from the adjusted position. The cylindrical portion 14 may be closed as by a cap 22 threadedly secured therein, having an inner or lower portion which bears on the upper face of the bracket 18 to prevent movement thereof upwardly off the shoulder 15. Suitable sealing means, such as the hermetic seal 23, as shown in Figs. 1 and 3, may be provided between the cap and the cylindrical portion.

The hinge bracket supports a valve closure member generally designated 25, which comprises an annular disk carrier or holder 26, best shown in Fig. 5, which has projecting along a portion of its outer periphery a hollow hinge portion 27 through which a hinge pin 28 may extend into the bores 20 of the bracket 18, so that the disk holder may swing about the axis of the pin, which of course coincides with the axis of the bores 20 and therefore is disposed parallel to the valve seat 13. The pin is journalled in the bracket 18 by suitable bushings 29, and a key 30 secures the pin and holder for rotation about the axis. Any other suitable arrangement of pin means may be provided for pivotally supporting the holder in the bracket to swing about the axis as described. On the inner periphery of the holder 26 is formed a tongue or rib 31, the inner or upper surface of which is convex as best shown in Fig. 6. A valve disk 32 completes the closure member, the disk having a diameter slightly less than the inner diameter of the holder and having a peripheral flat-bottomed groove 33 slightly wider than the rib 31 and receiving the rib therein so that the disk is secured in the holder by the tongue and groove interengagement. For facility of assembly, the disk is formed with a peripheral lip at one face which defines one side of the groove, and a notch adjacent the other face so that the disk may be slipped into the holder, and a locking ring 34 then disposed in the notch to form a lip defining the other side of the groove, the locking ring being welded or otherwise suitably secured in place. It will be evident that the valve member 25 is by this construction provided with a very short moment arm, facilitating quick and easy opening and closing. The disk 32 has a seating surface on at least one face for fluid tight engagement on the valve seat 13. Such surface may have a facing similar to that of the valve seat.

The valve member and hinge bracket construction permits rapid and simple assembly of the parts and mounting in the valve body. It is only necessary to engage the hinge portion 27 of the holder 26 between the arms 19 of the bracket 18 and insert the pin 28 through the aligned bores, the bushings 29 being first inserted, and then disposing the bracket on the shoulder 15 with the valve closure member 25 depending therefrom into the interior of the valve body. To assure sufficient clearance for insertion of the valve member, the side portions of the shoulder 15 are cut away as indicated at 35. The hinge bracket may then be moved as already mentioned to bring the hinge axis of the valve member into parallelism with the plane of the valve seat 13, so that the valve member will swing in a plane perpendicular to that of the seat and thus engage squarely on the seat so as to close properly. The bracket is held in the adjusted position and the lugs 21 are welded in place or other suitable means provided to hold the bracket against rotation from its adjusted position. The valve construction provides for reversibility of the valve disk, since it will be apparent that the bracket and valve member may readily be lifted out of the valve body after removal of the cap 22, and the valve member and bracket swung 180° relative to each other, thus reversing the valve member, and then reinserted. In this way, after the seating surface on one face of the disk requires replacement as because of wear, the seating surface on the other face of the disk may be presented to the valve body seat 13, and the useful life of the disk may thus be doubled. Although a seating surface is illustrated on only one face of the valve in the present instance, it will be clear that both faces of the disk may have seats or facings thereon for closing engagement with the valve seat 13, as pointed out hereinabove.

With this construction, also, the center of gravity of the valve member is located in the vertical plane of the hinge axis, so that the valve member 25 normally hangs plumb, or directly vertically below the hinge axis, in perfect balance. As clearly shown in Fig. 1, this normal position of the valve member 25, together with the angled downwardly facing disposition of the valve seat 13, results in the valve being normally open, so that inlet flow even at very low velocity may occur without any interference or resistance from the valve member 25. Nevertheless, because of the nice balance of the valve member, it swings easily in accordance with flow in either direction, and thus quickly closes against the reverse flow even at very low velocity. Because of this easy swinging of the valve member, the valve will come to fully open position at higher inlet velocities with a minimum of interference with the flow, thus minimizing pressure drop in the valve. The generally cylindrical construction of the valve body with a minimum of recesses or enlargements also contributes to only a low pressure drop by reason of elimination of turbulence in the valve and interference with flow therethrough. It will be noted that in fully open position, the valve member is disposed in the recess 16, substantially out of the path of flow through the valve body and in large measure cutting off the interior of the cylindrical portion 14 from the valve body. In Fig. 1, there is shown in dot-dash lines a conventional valve seat which is inclined, but reversely relative to the seat 13, so that it faces upwardly relative to the hinge axis instead of downwardly as in the case of the seat 13, with a valve disk in closed position on this upward facing seat. It will be clear that the invention is applicable to swing check valves with conventionally disposed seats, although some of the advantages which have just been described as resulting from the present invention are sacrificed. The advantages resulting from the construction of the valve closure member and its mounting are retained, however.

The disk 32 is secured in the holder 26 by the engagement of the rib 31 in the groove 33, as already explained, and is mounted to have a limited rocking movement in the holder. This is provided for by having the rib of slightly greater radial dimension than that of the groove, so that the end or upper surface of the rib engages the groove bottom, and having the width of the groove slightly greater than that of the rib. The upper surface of the rib is formed convex, so as to allow the disk to rock slightly. This permits the disk to adjust itself precisely to the body valve seat 13, or as the common expression of those skilled in the art goes, "to find its own seat." The mounting of the valve disk in an annular holder as provided by this invention has a further advantage in that the holder 26 forms in effect a shock resistant and somewhat resilient frame for the disk, serving to protect it against damage in swinging between fully open and fully closed positions.

The invention has been disclosed in only a single embodiment, but it will be obvious that various other forms may be given to the invention, and accordingly, it is not intended that the invention should be limited otherwise than as required by the spirit and scope of the appended claims.

I claim:

1. A swing check valve comprising a generally cylindrical valve body for substantially horizontal disposition, a vertically extending cylindrical portion opening from the body, an internal horizontal shoulder at the juncture of the body and cylindrical portion, a valve seat in the body below said shoulder, a generally segmental hinge bracket removably disposed on said shoulder having an arcuate surface engaging the inner surface of the cylindrical portion, a chordally disposed hinge pin carried by said bracket on an axis fixed relative to the bracket and disposable parallel to the plane of the valve seat by rotational adjustment of the bracket on the shoulder, initially movable stop means disposed in the cylindrical portion in position determined by engagement thereof with the bracket in rotationally adjusted position, means securing the stop means in said engaging position to maintain said axis parallel to said seat plane by prevention of bracket rotation, means engaging the bracket to prevent upward movement thereof from the shoulder, an annular holder in the body mounted on said pin swingable toward and from the seat, and a valve disk in the holder of slightly smaller diameter than the internal holder diameter engaging the seat in closed position, the periphery of the disk and internal periphery of the holder having one a rib and the other a groove of slightly smaller radial dimension and slightly greater width than the rib with the rib extending in the groove and having its upper surface engaging the groove bottom surface, at least one of said engaging surfaces being convex for limited rocking of the disk in the holder.

2. A swing check valve comprising a generally cylindrical body, a valve seat in the body, a valve member swingable toward and from the valve seat including a valve disk engaging on the seat in closed position and also including an annular disk holder encircling the disk, interengaging tongue and groove means on said disk and holder retaining the disk in the holder in limitedly rockable relation, hinge pin means mounting said holder for swinging movement disposed directly above the center of gravity of the valve member, a bracket carrying said pin means on a fixed axis having an arcuate surface defining a portion of its periphery, a hollow cylindrical portion extending radially from the body adjacent the valve seat having an inner surface engaging with said arcuate bracket surface, and an internal horizontal shoulder at the juncture of said body and cylindrical portion supporting said bracket for rotational adjustment positioning said pin parallel to the plane of said valve seat.

3. A swing check valve comprising a valve body, a valve seat in the body angularly disposed relative to the body axis with a portion thereof axially forward of the remainder, hinge means adjacent said forward seat portion providing a hinge axis parallel to the plane of the seat, and a valve member swinging on said axis toward and from the seat, said valve member including an annular holder pivotally mounted by said hinge means having its internal periphery formed with one of a rib and a groove and also including a valve disk of smaller diameter than the internal holder diameter carried in the holder engaging said seat in closed position having its periphery formed with the other of said rib and groove, said groove being slightly wider than said rib and of slightly smaller radial dimension and receiving said rib therein for securing the disk in the holder with the upper surface of the rib engaging the groove bottom surface, at least one of said surfaces being convex for limited rocking of the disk in the holder.

4. In a swing check valve including a valve body with a downwardly facing valve seat extending therein at an angle downwardly from an upper horizontal portion of the body and hinge means adjacent and axially spaced from the upper portion of the seat providing a pivot axis parallel to the plane of the seat, a valve closure in the body swinging on said axis toward and from the seat normally depending vertically below the axis, said closure comprising an annular disk holder member pivotally mounted by said hinge means and a valve disk member engaging the seat in closed position and mounted peripherally within said annular member, interlocking tongue and groove elements respectively on the adjacent peripheries of the members with the tongue element of slightly greater radial dimension than the groove for contact of the tongue edge surface on the groove bottom surface and the groove element having greater width than the tongue, one of said edge and bottom surfaces being convex for limited rocking of the disk in the holder.

5. In a swing check valve comprising a valve body having a valve seat therein and a radially extending hollow portion opening from the body adjacent the seat, hingedly mounted valve closure structure adjustable for precise closing engagement with the seat comprising a hinge bracket adjacent the seat rotatable in said hollow portion having means providing a hinge axis fixed relative to the bracket and disposable parallel to the plane of the seat by rotation of the bracket, means supporting the bracket in the hollow portion, initially movable means holding the bracket against movement from rotated position disposing the axis in said parallel relation and positioned by holding engagement with the bracket in said rotated position, means securing said holding means in said bracket-engaging position, an annular valve disk carrier in the body adjacent the seat mounted on the bracket swinging about said axis toward and from the seat, a valve disk peripherally mounted within the carrier engaging on the valve seat in closed position, the center of gravity of the disk and carrier in free position thereof falling in the vertical plane of said axis, a tongue and a groove on the adjacent peripheries of the disk and carrier interengaged to retain the disk in the carrier with the tongue of slightly greater radial dimension than the groove for engagement of the tongue edge surface with the groove bottom surface, said groove having slightly greater width than said tongue and at least one of said surfaces being convex for limited rocking of the disk in the carrier.

References Cited in the file of this patent

UNITED STATES PATENTS

| | | |
|---|---|---|
| 294,960 | Blessing | Mar. 11, 1884 |
| 345,420 | Eskholm | July 13, 1886 |
| 350,219 | Trott | Oct. 5, 1886 |
| 1,039,749 | Ingram | Oct. 1, 1912 |
| 1,125,606 | Tripp | Jan. 19, 1915 |
| 2,812,153 | Westling | Nov. 5, 1957 |